United States Patent
Aggas (10) Patent No.: US 6,946,171 B1
(45) Date of Patent: Sep. 20, 2005

(54) VACUUM IG PILLAR WITH LUBRICATING AND/OR REFLECTIVE COATING

(75) Inventor: Steven L. Aggas, Pinckney, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/401,414

(22) Filed: Sep. 22, 1999

(51) Int. Cl.$^7$ .............................. E06B 3/24; E04C 2/54
(52) U.S. Cl. ................... 428/34; 428/375; 428/376; 428/379; 428/389; 428/434; 428/699; 156/109; 52/786.13
(58) Field of Search ................... 428/34, 376, 379, 428/389, 432, 434, 688, 699; 156/109, 107; 52/786.13, 786.1, 172

(56) References Cited

U.S. PATENT DOCUMENTS

| | | |
|---|---|---|
| 49,167 A | 1/1865 | Stetson |
| 1,370,974 A | 3/1921 | Kirlin |
| 1,448,351 A | 3/1923 | Kirlin |
| 1,774,860 A | 9/1930 | Wendler et al. |
| 2,011,557 A | 8/1935 | Anderegg |
| 2,303,897 A | 12/1942 | Smith |
| 2,962,409 A | 11/1960 | Ludlow et al. |
| 3,441,924 A | 4/1969 | Peek et al. |
| 3,742,600 A | 7/1973 | Lowell |
| 3,902,883 A | 9/1975 | Bayer |
| 3,912,365 A | 10/1975 | Lowell |
| 3,936,553 A | 2/1976 | Rowe |
| 3,990,201 A | 11/1976 | Falbel |
| 4,054,419 A | 10/1977 | Smith et al. |
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,403,001 A | 9/1983 | Grenier |
| 4,514,450 A | 4/1985 | Nowobilski et al. |
| 4,824,215 A | 4/1989 | Joseph et al. |
| 4,874,461 A | 10/1989 | Sato et al. |
| 4,924,243 A | 5/1990 | Sato et al. |
| 4,983,429 A | 1/1991 | Takayanagi et al. |
| 5,063,097 A | 11/1991 | Hirota et al. |
| 5,124,185 A | 6/1992 | Kerr et al. |
| 5,157,893 A | 10/1992 | Benson et al. |
| 5,234,738 A | 8/1993 | Wolf |
| 5,247,764 A | 9/1993 | Jeshurun et al. |
| 5,266,498 A | 11/1993 | Takcha et al. |
| 5,315,797 A | 5/1994 | Glover et al. |

(Continued)

FOREIGN PATENT DOCUMENTS

| | | |
|---|---|---|
| DE | 2520062 | 11/1976 |
| DE | 2951330 | 7/1981 |
| EP | 0047725 | 12/1985 |
| EP | 0489042 | 6/1992 |
| EP | 0645516 | 3/1995 |
| FR | 7424197 | 9/1973 |
| FR | 8012696 | 6/1980 |
| FR | 2 482 161 | 11/1981 |

OTHER PUBLICATIONS

"Elements of Materials Science" by Van Vlack, Dept. of Chemical and Metallurgical Engineering, Univ. of Michigan, 1964, Second Edition.

*Primary Examiner*—Donald J. Loney
(74) *Attorney, Agent, or Firm*—Nixon & Vanderhye P.C.

(57) ABSTRACT

A vacuum insulating glass (IG) unit is provided with an array of spacers/pillars between opposing glass sheets. At least some of the spacers/pillars are coated on at least one surface thereof with a dry lubricant and/or reflective material such as silver. This coating permits the glass sheet(s) to move relative to one another during thermal expansion while minimizing the degree to which the spacers/pillars scratch or crack the glass during such relative movement. A method of making an exemplary spacer/pillar includes transforming by chemical reaction silver ions on a core into a metallic silver coating thereby resulting in a coated spacer/pillar.

18 Claims, 5 Drawing Sheets

U.S. PATENT DOCUMENTS

| | | |
|---|---|---|
| 5,372,631 A | 12/1994 | Barratt et al. |
| 5,399,406 A | 3/1995 | Matsuo et al. |
| 5,445,972 A | 8/1995 | Tarcha et al. |
| 5,489,321 A | 2/1996 | Tracy et al. |
| 5,499,128 A | 3/1996 | Hasegawa et al. |
| 5,552,573 A | 9/1996 | Okita et al. |
| 5,565,030 A | 10/1996 | Kado et al. |
| 5,596,981 A | 1/1997 | Soucy |
| 5,612,177 A | 3/1997 | Levy et al. |
| 5,657,607 A | 8/1997 | Collins et al. |
| 5,664,395 A | 9/1997 | Collins et al. |
| 5,739,882 A | 4/1998 | Shimizu et al. |
| 5,891,536 A | 4/1999 | Collins et al. |
| 5,897,927 A | 4/1999 | Tsai et al. |
| 6,049,370 A | 4/2000 | Smith, Jr. et al. |

FACE-CENTERED CUBIC

VACUUM IG PILLAR WITH LUBRICATING AND/OR REFLECTIVE COATING

RELATED APPLICATIONS

This application is related to commonly owned U.S. Ser. No. 09/303,550 filed May 3, 1999 entitled VACUUM IG PILLAR WITH DLC COATING, and Ser. No. 09/348,281 filed Jul. 7, 1999 entitled PERIPHERAL SEAL FOR VACUUM IG WINDOW UNIT, the disclosures of which are both hereby incorporated herein by reference.

This invention relates to structure for a vacuum insulating glass (IG) unit, and method of making the same. More particularly, this invention relates to a pillar for use in a vacuum IG window unit wherein the pillar includes a dry lubricating and/or reflective coating of low friction material such as silver (Ag) on at least one surface thereof, and a method of making the same.

BACKGROUND OF THE INVENTION

Vacuum IG units are known in the art. For example, see U.S. Pat. Nos. 5,664,395, 5,657,607, and 5,891,536, the disclosures of which are all hereby incorporated herein by reference.

Figure 1:
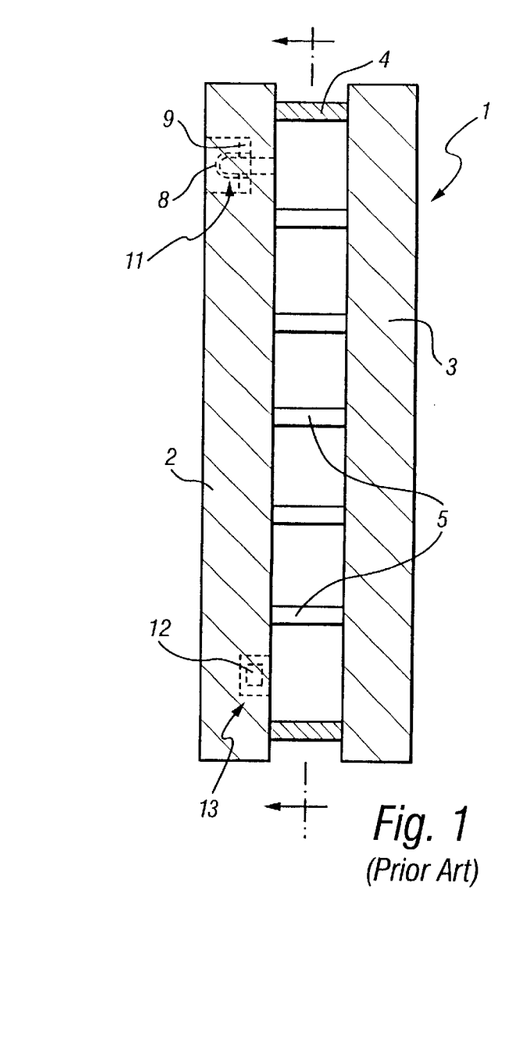
FIG. 1 is a prior art cross-sectional view of a conventional vacuum IG unit.
Figure 2:
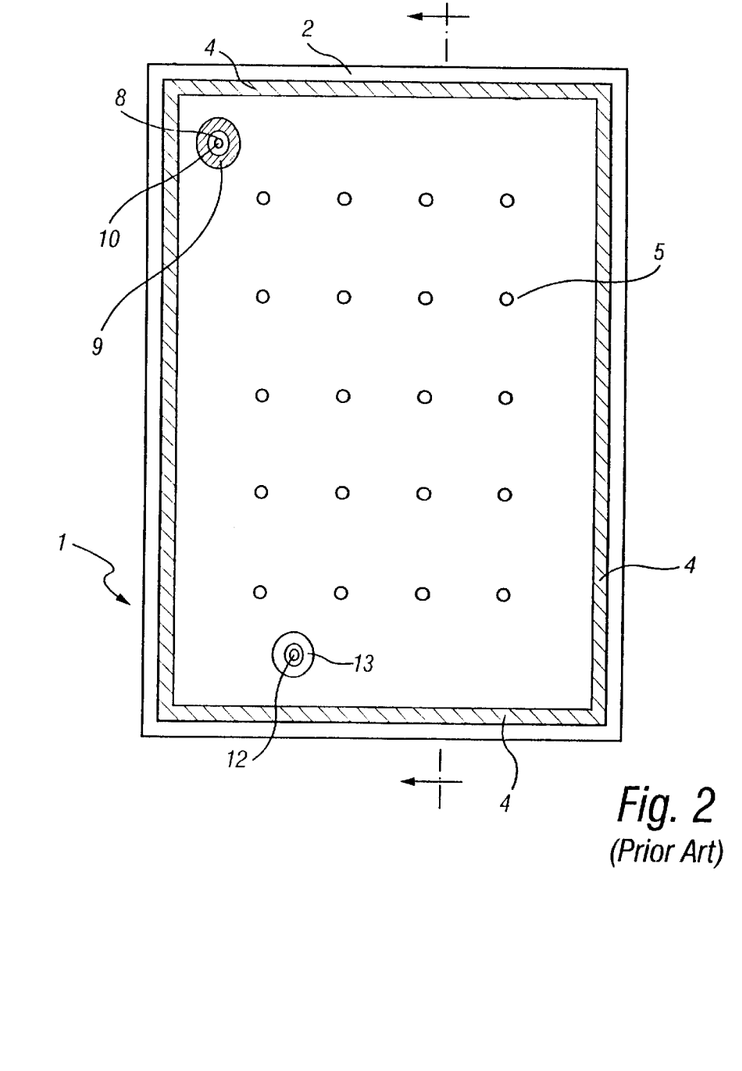
FIG. 2 is a prior art top plan view of the FIG. 1 vacuum IG unit, taken along the section line illustrated in FIG. 1.

Prior art FIGS. 1–2 illustrate a conventional vacuum IG unit. IG unit 1 includes two spaced apart sheets of glass 2 and 3 which enclose an evacuated or low pressure space therebetween. Glass sheets 2 and 3 are interconnected by peripheral seal of fused solder 4 and an array of support pillars 5.

Pump out tube 8 is hermetically sealed by solder glass 9 to an aperture or hole 10 which passes from an interior surface of glass sheet 2 to the bottom of recess 11 in the exterior face of sheet 2. When sheets 2, 3 and peripheral/edge seal 4 are in place, prior to the tube being sealed, a vacuum is attached to pump out tube 8 so that the interior cavity between sheets 2 and 3 can be vacuumed out to create a low pressure area. Chemical getter 12 may optionally be included within recess 13.

Figure 3:
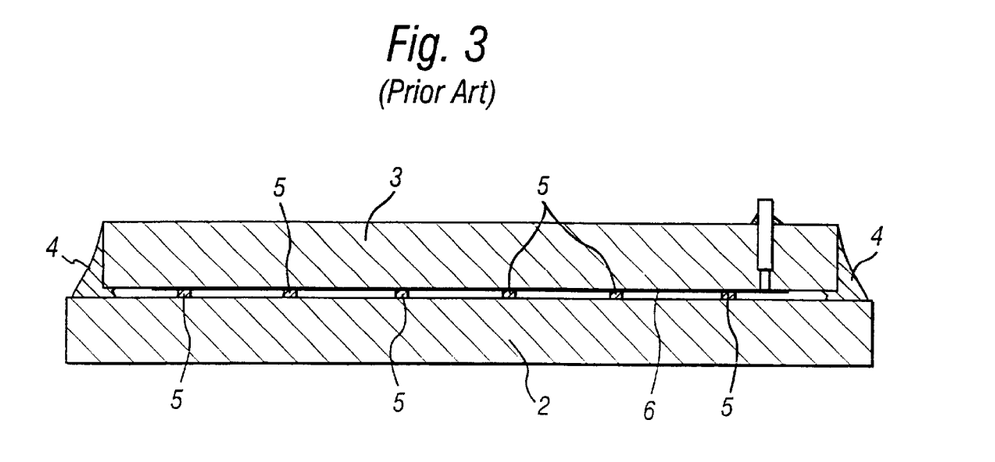
FIG. 3 is a prior art cross-sectional view of another conventional vacuum IG unit.

FIG. 3 is a side cross sectional view of another conventional vacuum IG unit, including support pillars 5 disposed between opposing glass substrates 2 and 3. The periphery of the unit is hermetically sealed by edge seal 4 of fused solder glass.

Pillars are in contact with opposing glass substrates 2 and 3, as shown in FIGS. 1–3. However, the heating of one substrate to a temperature greater than the other may cause pillar(s) to scratch and/or crack one of the glass substrates. For example, when substrate 3 is heated (e.g. a hot object is placed on substrate 3 or it is exposed to direct sunlight), the heated substrate 3 may expand as a function of temperature and the other substrate 2 (which is not heated as much) may not expand at all or not to the same degree. This results in the substrate(s) sliding or moving relative to one another when one expands more than the other. Such relative movement may cause pillar(s) 5 to dig into, scratch, or crack one or both of glass substrates 2, 3. This weakens the glass and the vacuum IG unit as a whole, and may also create aesthetic problems.

U.S. Pat. No. 5,124,185, incorporated herein by reference, discloses an IG unit including support pillars located between opposing substrates. Each pillar is adhesively secured to one of the substrates, with the opposite side of each pillar having a Teflon (trademark) coating thereon. Unfortunately, because each pillar is secured to one of the substrates, relative movement of the glass substrates may cause pillar(s) to dig into, scratch, and/or crack a glass substrate. The pillars cannot slide relative to both substrates.

In a similar manner, U.S. Pat. No. 5,891,536 to Collins et. al. discloses pillars including a silver coating thereon. However, the pillars do not appear to allow sliding of the substrate(s) relative thereto (i.e. pillar coating does not appear to be of a lubricating type). Instead, as explained at column 2, lines 34–35, of the '536 patent, only "a small amount of lateral sideways movement is possible." The '536 patent does not discuss or address whether its pillar coatings are reflective to any significant degree. Moreover, the disclosed methods of manufacturing the '536 pillars are believed to be less than desirable.

In view of the above, there exists a need in the art for: (i) a pillar less likely to scratch substrate(s) of a vacuum IG unit when the opposing substrates are subjected to relative movement, (ii) a pillar that will minimize or reduce the severity of scratching and/or cracking of vacuum IG glass substrates, (iii) a lubricated pillar that enables at least one or both of the substrates to slide relative to a contacting surface of the pillar, (iv) a pillar including a reflective coating thereon, and/or (v) a method of making a pillar(s) satisfying any or all of the above listed needs.

It is a purpose of this invention to fulfill any or all of the above described needs in the art, as well as other needs which will become apparent to the skilled artisan from the following detailed description of this invention.

SUMMARY OF THE INVENTION

An object of this invention is to provide a vacuum IG window unit where opposing glass substrates can slide or move relative to one another over at least one pillar (or spacer) designed to minimize substrate cracking and/or scratching.

Another object of this invention is to provide a spacer/pillar for use in a vacuum IG unit wherein the spacer/pillar is at least partially coated with a low friction lubricating material of or including a metal having a face-centered cubic crystal structure.

Another object of this invention is to provide a spacer/pillar for use in a vacuum IG unit wherein the spacer/pillar includes a reflective coating thereon which may make the spacer/pillar less visibly obtrusive to a viewer.

Generally speaking, this invention fulfills any or all of the above described needs in the art by providing a thermally insulating glass panel comprising:

first and second spaced apart glass substrates enclosing a low pressure space therebetween;

a seal interconnecting said first and second spaced apart glass substrates so as to seal said low pressure space between said substrates; and at least one spacer disposed in said low pressure space between said first and second substrates, wherein said spacer includes a core that is at least partially coated with a dry lubricant coating of sufficient thickness so that said dry lubricant coating has a specular visible light reflectance of at least about 80% and enables an adjacent one of said substrates to slide relative to said spacer.

This invention further fulfills any or all of the above described needs in the art by providing a spacer or pillar for location between glass substrates of a vacuum IG unit, said spacer or pillar comprising:

a core having first and second approximately planar surfaces that are substantially parallel to one another, wherein said core includes one of (i) metal, (ii) ceramic, and (iii) glass; and a metallic coating provided on each of said first and second approximately planar surfaces of said core for enabling substrates of a vacuum IG unit to slide relative to said core and relative to one another, and wherein said metallic coating has a specular reflectance of at least about 80% for certain visible light rays.

This invention still further fulfills any or all of the above described needs in the art by providing a method of making an insulating panel comprising the steps of;

providing a solution including silver and hydroxide ions;

locating a plurality of spacer cores in the solution so that silver ions in the solution contact respective spacer cores;

transforming by chemical reaction a plurality of the silver ions contacting cores into a metallic silver coating on a plurality of respective spacer cores to form a corresponding plurality of coated spacers; and causing the coated spacers to be located between a pair of substrates so as to space the substrates from one another.

This invention will now be described with reference to certain embodiments thereof as illustrated in the following drawings.

DETAILED DESCRIPTION OF CERTAIN EMBODIMENTS OF THIS INVENTION

Referring now more particularly to the accompanying drawings in which like reference numerals indicate like parts throughout the several views.

Certain embodiments of this invention relate to an improved support spacer or pillar 21 for use in a multiple glazing thermally insulating window unit, and a method of making the same. Pillars or spacers 21 of any of FIGS. 4–6 may be used instead of pillars 5 shown in the conventional insulating glass (IG) units of FIGS. 1–3, with the FIG. 5(c) structure being preferred in certain embodiments where the entire spacer/pillar is coated with a reflective and lubricating material.

In preferred embodiments, spacers/pillars 21 are used to support the opposing approximately flat and approximately parallel glass substrates 2, 3 of a vacuum IG unit. However, in alternative embodiments, spacers/pillars 21 may be provided in other types of multiple glazing window units.

In certain embodiments of this invention, each pillar 21 includes a core that is at least partially coated with a dry reflective and/or lubricating material 29 such as silver (Ag). Coating 29 allows one or both of substrates 2, 3 to slide relative thereto. Coating 29 may also eliminate and/or minimize the degree to which one or both of glass substrates 2, 3 is/are scratched or cracked by pillars when the substrate(s) move relative to one another such as when one is heated to a temperature substantially above the other. Moreover, the material (e.g. Ag) for coating 29 is preferably selected so as to reflect at least about 80% of visible light impinging thereupon, more preferably at least about 90%, and most preferably at least about 95%.

Figure 4:
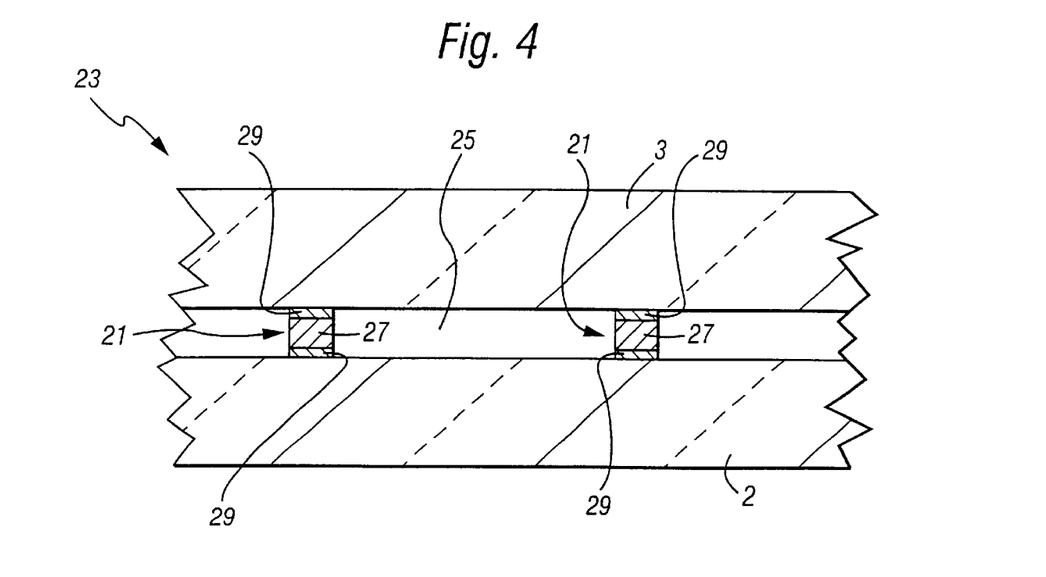
FIG. 4 is a side cross-sectional view of a portion of a vacuum IG unit according to an embodiment of this invention.

FIG. 4 is a cross sectional view of a portion of thermally insulating glass panel 23 according to an embodiment of this invention. Because internal or interior space 25 between substrates 2, 3 is at a pressure lower than atmospheric in general, this type of panel is often referred to as a vacuum insulating glass (IG) unit. Vacuum IG unit 23 includes first glass substrate 2, second glass substrate 3, low pressure or evacuated space 25 between substrates 2 and 3, an array of spacers/pillars 21, an optional pump out tube (not shown in FIG. 4) disposed in a hole or aperture formed in substrate 2 for permitting evacuation of space 25, and a peripheral or edge seal (see FIGS. 1–3) that hermetically seals low pressure space or cavity 25 between substrates 2, 3. The hermetic edge seal prevents air from entering space 25 and keeps the vacuum or low pressure therein. Space 25 between the glass sheets 2 and 3 is preferably from about 0.10 to 0.30 mm thick in certain embodiments.

IG window units 23 according to different embodiments of this invention may be used as residential or commercial windows. The evacuation of space 25 significantly reduces heat transport between glass substrates 2 and 3 due to gaseous conduction and convection. In addition, radiative heat transport between glass sheets 2 and 3 can be reduced to a low level by providing a low emittance (low-E) coating (s) on the internal surface of one or both of sheets 2, 3 (e.g. see the low-E coating 6 on the interior surface of sheet 3 in FIG. 3). High levels of thermal insulation can be achieved due to the evacuation of space 25 with or without a low-E coating being utilized.

Preferably, the pressure in space 25 is at a level below about $10^{-2}$ Torr, more preferably below about 1.0 mTorr, or $10^{-3}$ Torr, and most preferably below about $10^{-6}$ Torr. To maintain such low pressures, the internal surfaces of glass substrates 2 and 3 are adequately outgassed, and areas near the edges or peripheries of substrates 2, 3 are hermetically sealed together as shown in FIGS. 1–3. In certain embodiments of this invention, a pump out tube may be used, while in other embodiments no pump out tube is used and the IG unit is assembled or put together in a low is pressure or vacuum chamber to create the lower pressure in space 25.

An array of small, high strength lubricating and/or reflective support pillars 21 is provided between substrates 2 and 3 in order to maintain separation of glass sheets 2, 3 against atmospheric pressure. Pillars 21 result in stress concentrations in glass 2, 3 and provide thermal contact between the glass sheets 2, 3, thereby decreasing thermal insulation of the unit. It is desirable for pillars 21 to be visibly unobtrusive. Pillars 21 are constructed so that they enable substrate (s) 2 and/or 3 to move relative to one another without pillars significantly scratching or cracking either of the substrate(s). In certain embodiments, each pillar 21 has a height of from about 0.10 to 0.30 mm. Pillars 21 may be arranged in a suitable array in space 25, and may be of any geometric shape disclosed herein or in U.S. Pat. No. 5,664,395, incorporated herein by reference. Generally speaking, pillars 21 are held in place between the substrates by compressive force applied by the two substrates due to exterior pressure. However, coating 29 enables the sheets to move relative to the pillars under thermal expansion/contraction and the like.

In certain embodiments of this invention, referring to FIGS. 4–5, pillars 21 each include central core 27 coated with dry lubricating and/or reflective coating 29 on one or multiple exterior surfaces thereof. Core 27 may include or be made of ceramic or metal in different embodiments of this invention as discussed in either of the aforesaid U.S. Pat. Nos. 5,664,395 or 5,657,607, incorporated herein by reference. Pillar core 27 may, for example, include or be made of zirconium dioxide, alumina, tantalum (Ta), molybdenum (Mo), hardened tungsten, nickel-chrome alloys (i.e. Inconel), solder glass, steel, carbides, or combinations of any of the above materials. Other ceramic or metal materials having similar supportive and strength characteristics may also be used for core 27.

Reflective dry lubricant or low friction coating 29 is provided over at least a portion of core 27. In certain embodiments, coating 29 is made of or includes silver (Ag). Formation in an appropriate manner and the face-centered cubic crystal structure (see FIGS. 7–9 and 11) of coating material 29 (e.g. Ag) allows the coating to act as a lubricant relative to glass so that glass sheets 2, 3 can slide on and/or relative to the pillars and thus be free to move relative to one another. Pillars 21 may slide relative to both substrates in certain embodiments due to coating 29. Other metals such as Al which may have this crystal structure, and/or alloys thereof, may also be used for coating 29.

Another advantage of using Ag as coating 29 is its characteristic of light reflection. A silver coating of sufficient thickness and appropriate surface structure can reflect (specular reflectance) at least about 80% of any or all visible light rays impinging thereupon, more preferably at least about 90%, and most preferably at least about 95%. Such a highly reflective coating 29 is advantageous in that it causes room light to be reflected back at an observer in the room thereby reducing contrast between the pillars and the sky or area viewed through the window unit. This enables the pillars to be more visibly unobtrusive.

Coating 29 is preferably provided on core 27 in all areas of the pillar that contact a glass substrate 2, 3. In preferred embodiments (see FIG. 5(c)) the entire pillar core is coated with coating 29. "Contact" herein means both direct contact as shown in FIGS. 1–2 and 4, as well as indirect contact as shown in FIG. 3 where a low-E or other coating is provided between the pillar and substrate.

Prior to the pillars being disposed between substrates 2, 3, coating 29 is from about 35 to 100 $\mu$m thick in certain embodiments, more preferably from about 40 to 60 $\mu$m thick in certain areas. Specifically, coating 29 is of sufficient thickness to achieve the specular reflection characteristics discussed above when a pillar with coating 29 thereon is disposed between the substrates in the final vacuum IG unit (e.g. reflects at least about 80% of visible light rays, more preferably at least about 90% and most preferably at least about 95%). If layer 29 is too thin, for example, these reflection characteristics may not be achieved. It is noted that silver coating(s) 29 prior to being disposed and compressed between substrates 2, 3 need not have sufficient reflective characteristics; but when the pillars with coatings 29 thereon are compressed between the opposing substrates the coating can flatten and become appropriately reflective as discussed above.

Figure 5A:
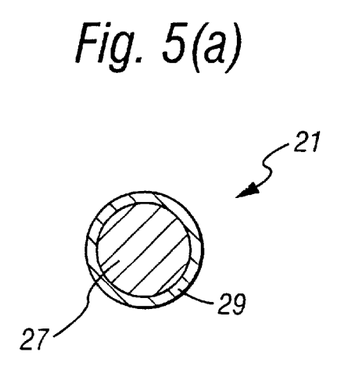
FIG. 5(a) is a side cross sectional view (through the middle of a pillar) illustrating a round spacer or pillar according to an embodiment of this invention that may be used instead of the pillars of FIG. 4.
Figure 5B:
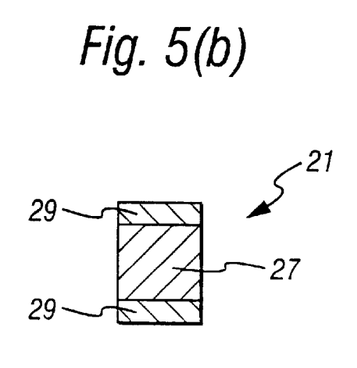
FIG. 5(b) is a side cross sectional view (through the middle of a pillar) illustrating one of the square or rectangular spacers/pillars of the FIG. 4 embodiment.

In the FIGS. 4 and 5(b) embodiment, pillar 21 is square or rectangular in shape, with only two of the pillar's six planar surfaces being coated. In other words, only the top and bottom planar surfaces of pillar core 27 in this embodiment are coated. In certain embodiments, it is possible for only one of the six planar pillar surfaces to be coated (e.g. the pillar surface adjacent substrate 2), while in other embodiments at least three (or all) of the pillar surfaces may be coated.

Referring to FIG. 4, the pillar has a first approximately planar surface adjacent and parallel to the first substrate and a second approximately planar surface adjacent and parallel to the second substrate, these first and second surfaces being approximately parallel to one another. In certain preferred embodiments, these first and second planar surfaces of the pillar include coating 29 thereon.

FIG. 5(a) is a cross sectional view of a spacer/pillar 21 according to another embodiment wherein the spacer/pillar 21 and core 27 are round, spherical, ellipsoid, flattened spheres, or oval, and approximately uniform coating 29 is provided over the entire outer surface/periphery of core 27.

Figure 5C:
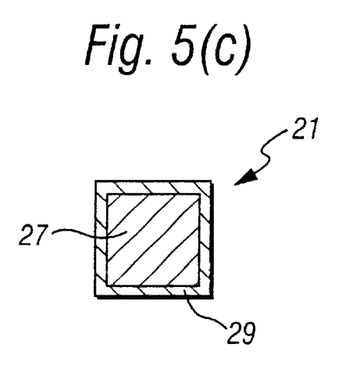
FIG. 5(c) is a side cross sectional view (through the middle of a pillar) illustrating a square or rectangular spacer/pillar with all sides coated that may be used instead of the spacers/pillars shown in FIG. 4.
Figure 6:
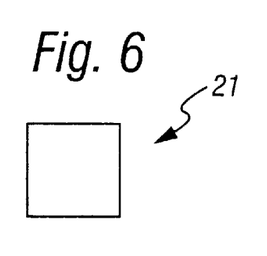
FIG. 6 is a top plan view of the pillars of FIGS. 4 and 5(b), illustrating that when viewed from above the pillars are rectangular in shape.
Figure 7:
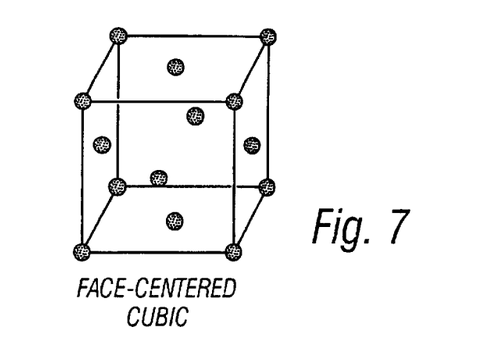
FIG. 7 is a schematic view of a Bravais lattice of a face-centered cubic crystal structure.
Figure 8:
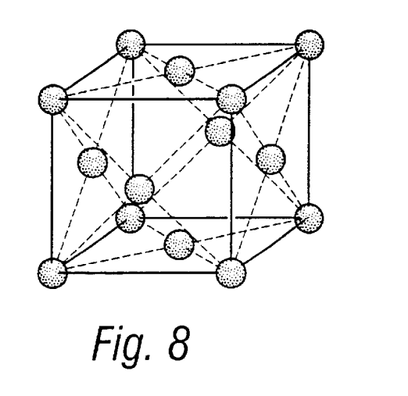
FIG. 8 is a schematic view of a face-centered cubic crystal structure of a metal, illustrating atom center locations.
Figure 9:
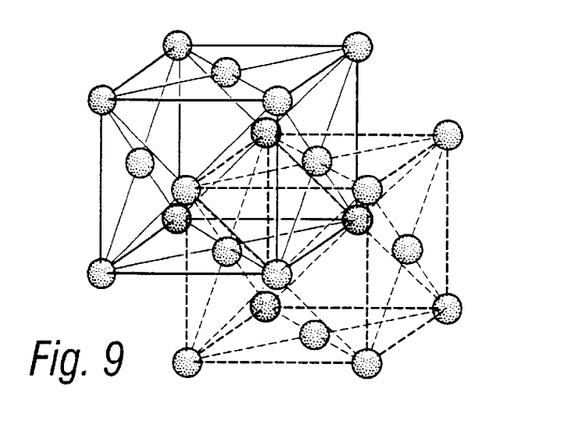
FIG. 9 is a schematic view of a face-centered cubic crystal structure of a metal, illustrating atom center locations.

FIG. 5(c) is a cross sectional view of a spacer/pillar 21 according to another embodiment of this invention, wherein core 27 is square or rectangular, and approximately uniform coating 29 is provided over the entire exterior of the core (i.e. all six planar surfaces of the core are coated). FIG. 6 is a top view of spacer/pillar 21 of either the FIG. 5(b) embodiment or the FIG. 5(c) embodiment.

Figure 5D:
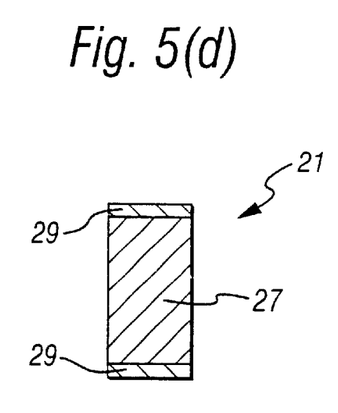
FIG. 5(d) is a side cross sectional view (through the middle of a pillar) illustrating a cylindrical-shaped spacer/pillar according to an embodiment of this invention that may be used instead of the spacers/pillars shown in FIG. 4.

FIG. 5(d) is a side cross sectional view of a spacer/pillar 21 according to another embodiment of this invention, wherein core 27 and spacer/pillar 21 are cylindrical in shape (a top view of this pillar would illustrate a circular body). In cylindrical spacer/pillar embodiments, the top and/or bottom planar surfaces may be coated as shown in FIG. 5(d), or alternatively the entire core 27 may be coated with material 29.

Spacers/pillars 21 from any of the FIGS. 5(a), 5(b), 5(c), or 5(d) embodiments may be used as spacers/pillars 21 in vacuum IG units 23 according to different embodiments of this invention. In still other embodiments, entire spacers/pillars may be made or formed of silver or any other suitable reflective material having a cubic or face-centered cubic crystal structure.

According to certain embodiments of this invention, the glass used for substrates 2 and 3 is soda lime silica glass. Other types of glass (e.g. borosilicate), colored or clear, may also be used. These glasses may be (i) thermally tempered, (ii) chemically tempered, or (iii) annealed and not tempered, according to different embodiments of this invention. In certain embodiments, glass sheets 2 and/or 3 may be from about 1 to 4.5 mm thick.

FIGS. 7–9 and 11 illustrate face-centered cubic crystal structures of silver. A molecule has a structural regularity because covalent bonds maintain a specific number and orientation of neighbors for each atom. A majority of engineering materials have atom arrangements which also have repeating patterns in three dimensions. Such structures are called crystals. Referring to FIGS. 7–9 and 11, in addition to an atom at the corner of each unit cell, there is one at the center of each face as shown, but none at the center of the cube. Such a lattice is called "face-centered cubic" or fcc. Typically, a metal with a face-centered cubic crystal structure has four times as many atoms as it has unit cells. The eight corner octants contribute one atom, and the six face-centered atoms contribute a total of three atoms per unit cell. The lattice constant "a" is related to the atomic radius by: $a_{fcc}=4r/\sqrt{2}$. Face-centered cubic structure may have a packing factor of about 0.74, and thus may also be called a cubic close-packed structure.

Figure 10:
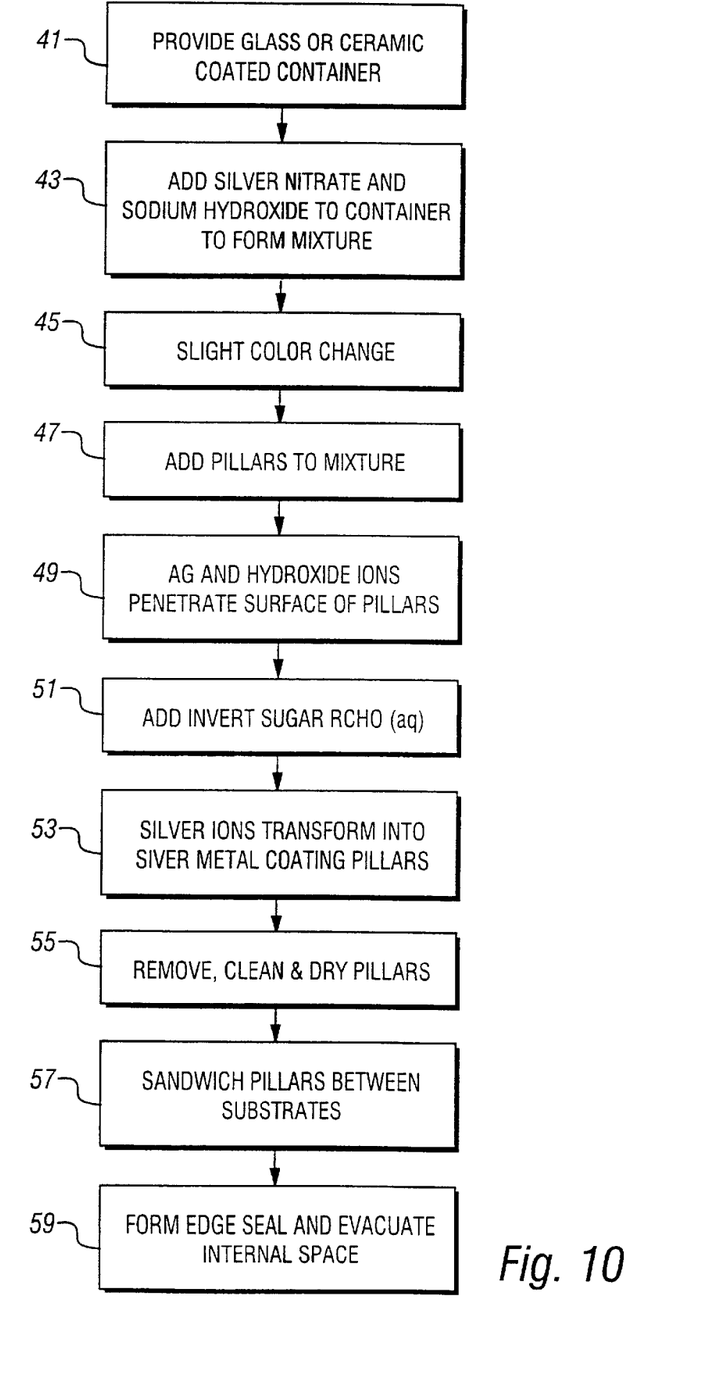
FIG. 10 is a flow chart illustrating steps performed according to an embodiment of this invention.
Figure 11:
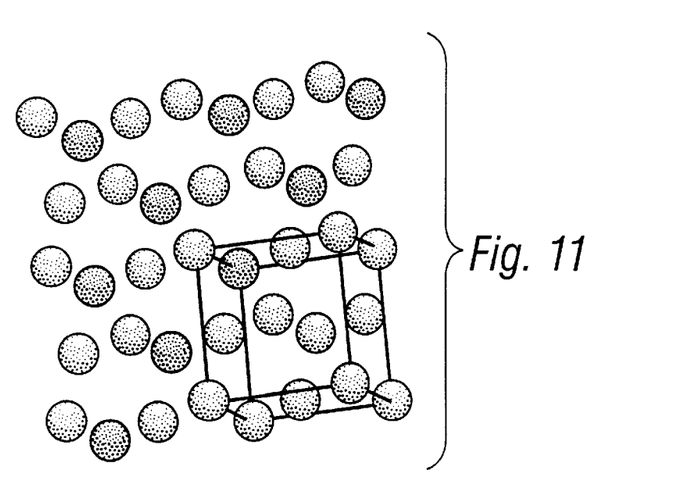
FIG. 11 is a schematic view of a face-centered cubic crystal structure.

Referring to at least FIGS. 5(c) and 10, an example of how a vacuum IG unit 23 may be made is explained. This exemplary method of manufacture is not intended to be limiting, but is provided instead for purposes of example. Initially, a glass or ceramic coated container is provided 41. Silver nitrate and sodium hydroxide, each in solution or aqueous form, are added to the container 43 to form a mixture at room temperature. When, for example, sodium hydroxide is first poured into the container, the silver nitrate is then poured thereinto until the solution slightly changes from a substantially clear to an approximately tea color at step 45. This solution mixture may be stirred, as it retains its approximately tea-shade color. Pillar cores 27 of any suitable shape and/or size are then added or dropped into the container so as to be immersed in the solution mixture at step 47. The mixture may be stirred to allow entrapped air to exit pillar core surfaces. At step 49, silver (Ag) and hydroxide ions in the mixture penetrate or adhere to the surfaces of immersed pillar cores 27. After optional stirring, invert sugar RCHO(aq) is added to the solution mixture at step 51 to cause the following chemical reaction to occur:

RCHO(aq)+2[Ag(NH$_3$)]$^+$(aq)+OH$^-$(aq) - - - >RCOO$^-$(aq)+2NH$_4^+$(aq)+2NH$_3$(aq)+2Ag(s)

This chemical reaction results in the silver ions in the solution being transformed into a substantially pure silver (Ag) metallic coating 29 on each core 27, at step 53. The coated pillars 21 are then removed from the container (e.g. by straining), cleaned (e.g. with water rinse), and dried (e.g. using blown air at a temperature of from about 80 to 140 degrees F.) at step(s) 55. An array of coated pillars 21 is then sandwiched between glass substrates 2 and 3 at step 57. Edge seal 4 is formed and internal space 25 evacuated at step 59 to form vacuum IG unit 22.

According to yet another embodiment of this invention, such a pillar can be made utilizing the above-listed equation but through different method steps. Tollen's reagent is a mild oxidizing agent containing complex silver ions produced by dissolving silver oxide in excess ammonia, i.e., Ag(NH$_3$)$^+$ (aq). When an aldehyde is mixed with Tollen's solution and the mixture is heated (in certain embodiments, the mixture in the aforesaid embodiment may be heated in such a manner), the silver ions are reduced to silver and a silver mirror-like coating forms, which attaches to the surface of the pillars in the solution. Another exemplary method of making such pillars is as follows. The silver nitrate solution and the sodium hydroxide solution are poured into a container such as a beaker. A dark grey precipitate is formed. Ammonia solution is poured into the container, so that the precipitate dissolves. Ammonia solution is added by drop(s) and the result stirred until a clear solution is obtained. The clear solution is poured into another container or basin, followed by warm glucose solution. Pillar cores are immersed therein. The coated pillars are then removed after from about ten to thirty minutes (e.g. twenty minutes). The coated pillars are then washed using tap water or the like. The pillars may then optionally be dipped in alcohol. The coated pillars are then dried using warm or heated blown air, and thereafter located between substrates 2 and 3.

According to still another embodiment of this invention, coating 29 according to any embodiment herein (e.g. any core being coated with 29, or the pillar consisting essentially of material 29) may be made of or include Alphaslick™ dry lubricant material available from NEMB (e.g. nemb@esslink.com). Such material includes tungsten disulfide—lamellar form, and has a coefficient of friction of no greater than about 0.30 (inclined plane technique). Alphaslick has a density of from about 7 to 8 gms/cc. Continued use/sliding may cause the material to resemble a Rhodium finish. Optionally, coating 29 may also be made of or include Rh. In other embodiments, coating 29 may include a layer of Alphaslick coated with a layer of Rh. Such coatings 29 preferably provide the same reflection characteristics discussed above with regard to silver.

Rh may be formed as a coating 29 in any embodiment herein as follows: Rh inclusive residue is melted with sodium bisulphate with the resulting mixture extracted water to give a solution containing rhodium sulphate, Rh$_2$(SO$_4$)$_3$. The Rh is precipitated out as the hydroxide by addition of sodium hydroxide, HaOH, and redissolved in hydrochloric acid, Hcl, to give H$_3$RhCl$_6$. This may be treated with NaNO$_2$ and NH$_4$CL to form a precipitate of the rhodium complex (NH$_4$)$_3$[Rh(NO$_2$)$_6$]. Dissolution of the precipitate in hydrochloric acid gives a solution of pure (NH$_4$)$_3$RhCl$_6$. Evaporation to dryness and burning under hydrogen gas gives pure rhodium (Rh) coating 29 on a pillar core.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A thermally insulating glass panel comprising:
   first and second spaced apart glass substrates enclosing a low pressure space therebetween;
   a seal interconnecting said first and second spaced apart glass substrates so as to seal said low pressure space between said substrates; and
   at least one spacer disposed in said low pressure space between said first and second substrates, wherein said spacer includes a core that is at least partially coated with a dry lubricant coating of sufficient thickness so that said dry lubricant coating has a specular visible light reflectance of at least about 80% and enables an adjacent one of said substrates to slide relative to said spacer.

2. The thermally insulating glass panel of claim 1, wherein said core is entirely coated with said coating, and wherein said coating includes a material having a face-centered cubic crystal structure.

3. The thermally insulating glass panel of claim 2, wherein said material is silver (Ag).

4. The thermally insulating glass panel of claim 2, wherein said coating has a thickness in at least one portion thereof of from about 35 to 100 µm.

5. The thermally insulating glass panel of claim 1, wherein said first and second substrates are soda lime silica glass substrates, said substrates are substantially parallel to one another, and said coating consists essentially of one of: silver (Ag), Rh, and tungsten disulfide.

6. The thermally insulating glass panel of claim 1, wherein said spacer includes a first approximately planar surface adjacent said first substrate and a second approximately planar surface adjacent said second substrate, and wherein said first and second approximately planar surfaces are approximately parallel to one another.

7. The thermally insulating glass panel of claim 6, wherein said first and second approximately planar surfaces of said spacer include said coating thereon.

8. The thermally insulating glass panel of claim 1, wherein said spacer is approximately shaped in a form of one of a square, a rectangle, a sphere, an oval, and a cylinder.

9. The thermally insulating glass panel of claim 1, wherein maid core includes at least one of zirconium dioxide, alumina oxide, tantalum (Ta), zirconium, molybdenum (Mo), hardened tungsten, chrome, stainless steel, solder glass, and carbide.

10. An insulating glass (IG) window unit comprising:
first and second glass substrates spaced from one another so as to define a low pressure space therebetween, said low pressure space having a pressure less than atmospheric pressure;
at least one spacer disposed in said low pressure space between said substrates; and
wherein said spacer includes a core having a coating thereon including a face-centered cubic crystal structure, said coating characterized by a specular reflectance of at least about 80% of certain visible light rays.

11. The IG unit of claim 10, wherein said coating has a specular visible light reflectance of at least about 90%.

12. The IG unit of claim 11, wherein said coating consists essentially of silver and has a specular visible light reflectance of at least about 95%.

13. A spacer or pillar for location between glass substrates of a vacuum IG unit, said spacer or pillar comprising:
a core having first and second approximately planar surfaces that are substantially parallel to one another, wherein said core includes one of (i) metal, (ii) ceramic, and (iii) glass; and
a metallic coating provided on each of said first and second approximately planar surfaces of said core for enabling substrates of a vacuum IG unit to slide relative to said core and relative to one another, and wherein said metallic coating has a specular reflectance of at least about 80% for certain visible light rays.

14. The spacer or pillar of claim 13, wherein said coating includes silver and has a thickness of from about 0.35 to 100 µm in at least one area thereof.

15. The spacer or pillar of claim 13, wherein said core is entirely coated with said coating.

16. A method of making an insulating panel comprising the steps of:
providing a solution including silver and hydroxide ions;
locating a plurality of spacer cores in the solution so that silver ions in the solution contact respective spacer cores;
transforming by chemical reaction a plurality of the silver ions contacting cores into a metallic silver coating on a plurality of respective spacer cores to form a corresponding plurality of coated spacers; and
causing the coated spacers to be located between a pair of substrates so as to space the substrates from one another.

17. The method of claim 16, wherein said transforming step includes the following chemical reaction:

RCHO(aq)+2[Ag(NH$_3$)]$^+$(aq)+OH$^-$(aq) - - - >RCOO$^-$(aq)+2NH$_4^+$ (aq)+2NH$_3$(aq)+2Ag (s).

18. A thermally insulating panel comprising:
a plurality of spacers provided between first and second substrates in order to space the substrates from one another so that a low pressure space is located between the substrates, said low pressure space having a pressure less than atmospheric pressure; and
wherein at least one of said spacers comprises a face-centered cubic crystal structure.

* * * * *